Patented Mar. 26, 1940

2,194,857

UNITED STATES PATENT OFFICE 2,194,857

POLYAZO DYESTUFFS CONTAINING METAL

Hans Krzikalla and Walter Limbacher, Ludwigshafen-on-the-Rhine, Germany, assignors to General Aniline & Film Corporation, a corporation of Delaware No Drawing. Application February 18, 1938, Serial No. 191,178. In Germany March 19, 1937

3 Claims. (Cl. 260—147)

The present invention relates to polyazo dyestuffs containing metal.

We have found that very valuable polyazo dyestuffs containing metal are obtained by treating with agents supplying trivalent metal disazo or polyazo dyestuffs which contain at least two sulphonic acid groups and which have been prepared by coupling 1 molecular proportion of tetrazotized 4.4'-diaminodiphenyl-3.3'-dicarboxylic acid or its substitution products with 2 molecular proportions of azo components of which at least one is a pyrazolone derivative.

Suitable azo components of the pyrazolone series for the preparation of the dyestuffs are, for example, 1-(4'-sulpho-phenyl)-3-methyl-5-pyrazolone, 1-(3'-sulphophenyl)-3-methyl-5-pyrazolone, 1-beta'-naphthyl-3-methyl-5-pyrazolone-5'.7'-disulphonic acid, 1-beta'-naphthyl-3-methyl-5-pyrazolone-4'.8'-disulphonic acid, 1-(2'-chlor-5'-sulphophenyl)-3-methyl-5-pyrazolone, 1-phenyl-3-methyl-5-pyrazolone or 3-methyl-5-pyrazolone. If the dyestuff is prepared while using only 1 molecular proportion of a pyrazolone component, it is preferable to use as the other azo component compounds which bear, in ortho-position to the position in which the coupling takes place, a group capable of forming a metal complex, as, for example, naphtholsulphonic acids or aminonaphthol-sulphonic acids, such as 2.5-aminonaphthol-7-sulphonic acid, 1.8-aminonaphthol-3.6-disulphonic acid, 2.8-aminonaphthol-3.6-disulphonic acid or 1.8-acetylaminonaphthol-3.6-disulphonic acid as well as the monoazo dyestuffs obtainable by coupling diazo compounds with 1.8-aminonaphthol-3.6-disulphonic acid in acid solution. For the preparation of the complex trivalent metal compounds there are employed mainly compounds of chromium, iron, nickel or cobalt.

The azo dyestuffs containing trivalent metal thus prepared are especially suitable for dyeing animal fibers, especially leather of all kinds. They yield uniform dyeings which have very good fastness to light, washing, acid and alkali.

The following examples will further illustrate how our said invention may be carried out in practice, but the invention is not restricted to these examples. The parts are by weight.

Example 1

A tetrazo solution prepared in the usual manner from 27.2 parts of 4.4'-diaminodiphenyl-3.3' dicarboxylic acid is coupled with a solution of 55.8 parts of 1-(4'-sulphophenyl)-3-methyl-5-pyrazolone rendered alkaline with soda or acid with acetic acid. The finished dyestuff is salted out, filtered off by suction and washed. It is then dissolved in from about 500 to 600 parts of water and heated for 3 hours at 110° C. under pressure with a chromium formate solution corresponding to a content of 18.4 parts of $Cr_2O_3$. The dyestuff obtained, containing chromium, is salted out, filtered off by suction and dried. It dyes leather uniform red-orange shades of very good fastness to light, washing, acid and alkali.

The nickel or cobalt compound prepared in a corresponding manner has similar properties.

Similar dyestuffs are obtained by using 1-(3'-sulphophenyl)-3-methyl-5-pyrazolone, 1-(6'-chlor-2'-methyl-4'-sulphophenyl)-3-methyl-5-pyrazolone or 1-(2'-chlor-5'-sulphophenyl)-3-methyl-5-pyrazolone as azo components.

Example 2

A tetrazo solution prepared from 27.2 parts of 4.4'-diaminodiphenyl-3.3'-dicarboxylic acid is coupled with a solution of 84.4 parts of 1-beta'-naphthyl-3-methyl-5-pyrazolone-4'.8'-disulphonic acid in a solution rendered alkaline with soda. The resulting dyestuff is worked up in the manner described in Example 1 and then chromed. The dyestuff containing chromium, dyes leather red shades very fast to light, washing, acid and alkali.

If 1-beta'-naphthyl-3-methyl-5-pyrazolone-5'.7'-disulphonic acid be used as azo component, a dyestuff having similar properties is obtained.

Example 3

A tetrazo solution prepared from 27.2 parts of 4.4'-diaminodiphenyl-3.3'-dicarboxylic acid is coupled with a solution of 31.9 parts of 2.8-aminonaphthol-3.6-disulphonic acid which has been rendered alkaline with soda. The monoazo dyestuff thus obtained is converted into the disazo dyestuff by reaction with an aqueous solution of 27.9 parts of 1-(4'-sulphophenyl)-3-methyl-5-pyrazolone. The disazo dyestuff is salted out and filtered off by suction and then chromed in the manner described in Example 1. The dyestuff containing chromium, dyes leather fast brown shades.

A dyestuff giving somewhat more yellowish dyeings is obtained by using 1.8-acetylaminonaphthol-3.6-disulphonic acid as azo component instead of 2.8-aminonaphthol-3.6-disulphonic acid.

The dyeing of leather with the above mentioned dyestuffs may be carried out in the following manner:

Neutralized chrome leather is dyed in a dye-bath with a bath ratio of 1:4, which contains from 1 to 3 per cent of a complex metal compound of an azo dyestuff, for about 20 to 30 minutes at from 60 to 65° C. After adding about 2 per cent of sulphonated neat's foot oil, the leather is dyed for a further 15 minutes, then 1 to 3 per cent of acetic acid are added and dyeing is continued for further 15 minutes. The leather is then rinsed and worked up in the usual manner.

Glacé leather, which has been pretreated in the usual manner, may be dyed for 2 hours at from 40° to 50° C. in a dye-bath with a bath ratio of 1:5 with from 1 to 3 per cent of the complex chromium compound of an azo dyestuff. A suspension of egg-yolk in water is then added, dyeing is continued for 30 minutes, from 0.5 to 1.5 per cent of formic acid (85 per cent) and 1 per cent of chromium acetate being added after each 30 minutes. The leather thus dyed is rinsed and worked up as usual. (The bath ratio and the percentages are with respect to the weight of the leather).

What we claim is:

1. Complex trivalent metal compounds of polyazo dyestuffs of the general formula

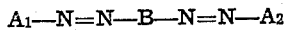

wherein $A_1$ and $A_2$ represent radicles of sulphonic acids of the pyrazolone series, and wherein B stands for a diphenyl dicarboxylic acid bearing the carboxyl groups in ortho-position to the azo groups.

2. Complex trivalent metal compounds of polyazo dyestuffs of the general formula

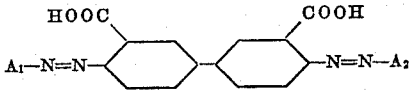

wherein $A_1$ and $A_2$ represent radicles of sulphonic acids of the pyrazolone series.

3. Complex trivalent metal compounds of polyazo dyestuffs of the general formula

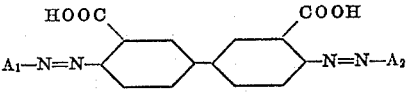

wherein $A_1$ and $A_2$ represent radicles of 1-(sulphoaryl)-3-methyl-5-pyrazolones.

HANS KRZIKALLA.
WALTER LIMBACHER.